United States Patent [19]

Wood

[11] Patent Number: 4,503,680
[45] Date of Patent: Mar. 12, 1985

[54] ATTACHMENT FOR EXHAUST PIPE

[75] Inventor: Terry G. Wood, Fountain City, Ind.

[73] Assignee: Allis-Chalmers Corp., Milwaukee, Wis.

[21] Appl. No.: 591,241

[22] Filed: Mar. 20, 1984

Related U.S. Application Data

[63] Continuation-in-part of Ser. No. 318,477, Nov. 5, 1981, abandoned.

[51] Int. Cl.³ .................. F02B 37/00; F16L 25/00
[52] U.S. Cl. .................................. 60/605; 285/233; 285/368; 285/412
[58] Field of Search .................. 60/600, 602, 605; 285/233, 368, 412

[56] References Cited

U.S. PATENT DOCUMENTS

| | | | |
|---|---|---|---|
| 1,314,410 | 8/1919 | McCulloch | 285/233 |
| 1,620,924 | 3/1927 | Snell | 285/368 |
| 3,704,995 | 12/1972 | Hetherington | 285/412 |
| 3,912,306 | 10/1975 | McCormick | 285/412 |
| 4,104,882 | 8/1978 | Gillbrand | 60/605 |
| 4,209,177 | 6/1980 | Hall | 285/368 |
| 4,236,376 | 12/1980 | Henke | 60/602 |

Primary Examiner—Douglas Hart
Attorney, Agent, or Firm—Arthur L. Nelson

[57] ABSTRACT

An attachment for an exhaust pipe. A rolled bead of the exhaust pipe is formed on its outer periphery providing a seal with a turbo-charger outlet flange and a clamp ring bolted around the bead. The exhaust pipe is adapted for supporting the muffler.

9 Claims, 5 Drawing Figures

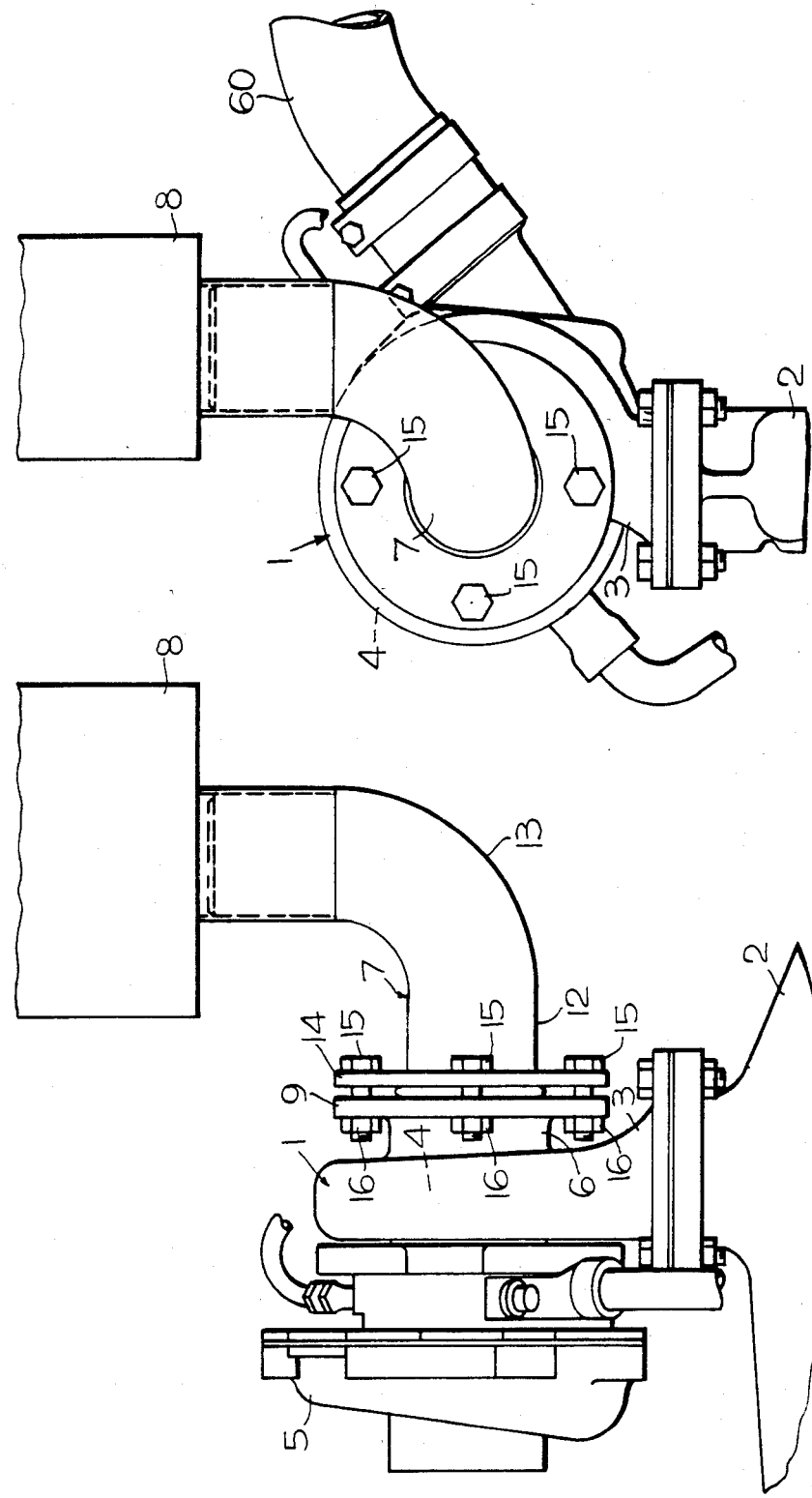

4,503,680

ATTACHMENT FOR EXHAUST PIPE

This application is a continuation-in-part of application Ser. No. 318,477, filed Nov. 5, 1981, now abandoned.

This invention relates to an exhaust pipe for an internal combustion engine and more particularly to a means of attaching the exhaust pipe to the outlet of a supercharger and providing a means of supporting a muffler. The exhaust pipe can be rotated to provide infinite positioning of the exhaust pipe.

Conventional exhaust pipes of cast iron have a machined surface to assure seal integrity in mounting with a mating surface to form an exhaust pipe coupling. If a steel flange is used on the exhaust pipe or elbow, the flange must be welded on the pipe to provide the flange for sealing. If orientation of the exhaust pipe is changed, a cast iron pipe must be drilled differently or a flange of a welded exhaust pipe must have a different flange welded to the pipe to accommodate any change in positioning of the exhaust pipe.

The applicant's invention has a rolled bead on the outer periphery of the exhaust pipe to form a seal and allow an infinite number of positions of the exhaust pipe by the use of two components.

U.S. Pat. No. 3,035,505, Lee, and U.S. Pat. No. 3,133,612, Sailler, show exhaust pipes. The Lee patent shows a means of trapping moisture and draining the moisture before it is allowed to enter the internal combustion engine while the Sailler patent shows a laminated engine exhaust pipe for sound deadening of the exhaust system. The applicant's invention provides a coupling for mounting of the exhaust pipe and a seal in the coupling permitting infinite positioning of the exhaust pipe.

It is an object of this invention to provide a mounting for an exhaust pipe of an internal combustion engine.

It is another object of this invention to provide a coupling for mounting of the exhaust pipe and to provide seal integrity of the exhaust pipe coupling.

It is a further object of this invention to provide a coupling for mounting an exhaust pipe and provide seal integrity between the supercharger discharge pipe and the exhaust pipe and for supporting of a muffler. The coupling provides for infinite positioning of the exhaust pipe.

The objects of this invention are accomplished by forming a rolled bead on the external periphery of an exhaust pipe for mounting between a flange on the turbo-charger discharge pipe and a clamp ring to fasten the exhaust pipe for infinite positioning of the exhaust pipe and assure seal integrity of the pipe in any selected position.

Referring to the drawings, a preferred embodiment of this invention is illustrated.

FIG. 1 illustrates a side elevation view of a turbocharger and the exhaust pipe mounting.

FIG. 2 is an end view of the turbo-charger showing the exhaust pipe mounting and a support for a muffler.

Figure 3:
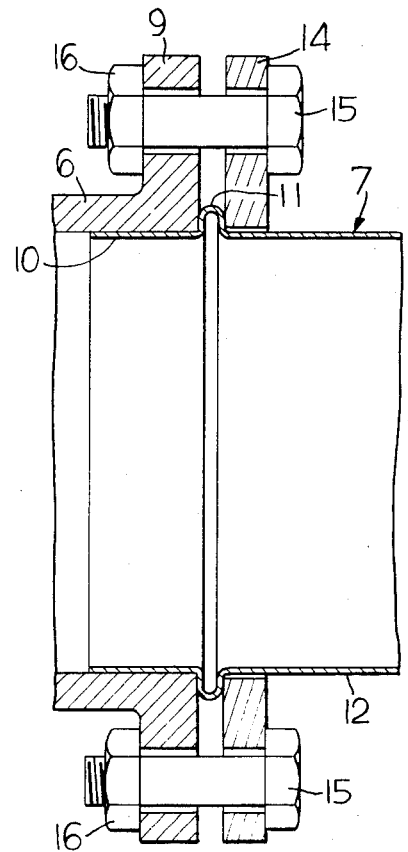
FIG. 3 is a cross section view of the turbo-charger supporting flange, the exhaust pipe and a clamping ring forming a coupling.

Referring to the drawings, the turbo-charger 1 is mounted on an engine 2. Exhaust gas is supplied through the conduit 3 to the turbine 4 which drives the compressor 5 compressing air in the conduit 60 which leads to the intake manifold. The turbine 4 allows exhaust gas to expand and then delivers exhaust gas to the discharge conduit 6. Discharge conduit 6 is connected to the exhaust pipe 7 which supports a muffler 8 for the engine. The turbo-charger discharge conduit 6 is integral with the flange 9 which embraces the exhaust pipe inlet 20 of the exhaust pipe 7. The bead 11 is a rolled bead rolled from the inside forming a raised ridge around the periphery of the exhaust pipe. A portion 12 of the exhaust pipe 7 extends to the elbow 13. The clamping ring 14 is fastened by a plurality of bolts 15 and nuts 16 which clamp the flange 9 and clamping ring 14 firmly against the bead 11 to form seal integrity between the discharge conduit 6 of the turbo-charger 1 and the exhaust pipe 7. The exhaust pipe can be rotated to any position desired by merely loosening the bolts and nuts on the clamping ring 14 and rotating the exhaust pipe. By tightening of the bolts, a positive seal in the re-oriented position is achieved. Since the bolts 15 do not extend through a flange integral with the exhaust pipe, but merely extend through a clamping ring, infinite positioning of the exhaust pipe is possible.

Figure 4:
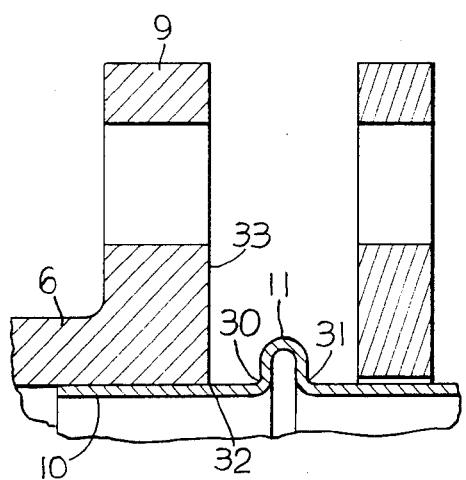
FIG. 4 illustrates the exhaust pipe received and partially assembled within the discharged conduit of the supercharger and the clamping ring.
Figure 5:
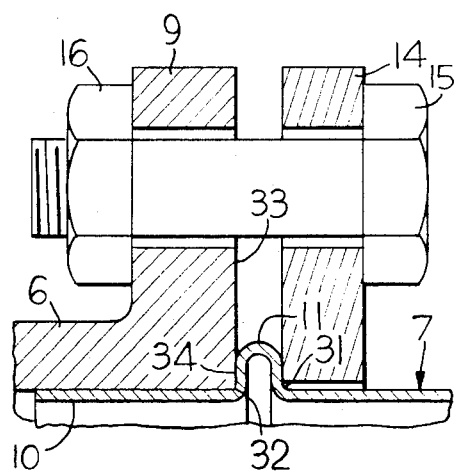
FIG. 5 illustrates an enlarged assembled view of the exhaust pipe on the turbocharger discharge conduit with a clamping ring 14 in assembled position.

More specifically, the exhaust pipe 7 as shown in FIGS. 4 and 5 illustrates the radii 30, 31 adjoining the bead 11 with the cylindrical portion of the exhaust pipe. The exhaust 30 is deformed by the edge 32 of the flange 9 on the turbocharger discharge conduit 6 when the exhaust pipe is assembled with the clamping ring 14. The edge 32 forms essentially a right angle configuration and deforms the radius 30 when assembly is completed. FIG. 5 generally illustrated the assembled position in which the edge 32 deforms adjoining portion of the bead 11 to form seal integrity at the base of the bead. The clamping force of the bolts is sufficient to cause the deformation which provides for seal integrity between the exhaust pipe and the discharge conduit.

Bolting the clamping ring 14 to the flange 9 assures a fixed position of the exhaust pipe and seal integrity because of the firm contact between the flange and the adjoining curvature between the bead 11 and the inlet 10 of the exhaust pipe 7. In the assembled position, the radial flange 33 on the flange 9 presses firmly against the radial facing 34 of the bead 11 which also tends to assure seal integrity between the two members.

The device operates in the following described manner. The exhaust pipe 7 is positioned in the turbocharger discharge conduit 6 and assembled with the bead 11 contacting the flange 9 of the turbo-charger discharge conduit. The clamping ring 14 is positioned over the exhaust pipe and similarly abuts against the outer surface of the bead 11. Bolting of the clamp ring 14 to the flange 9 assures a fixed position of the exhaust pipe 7 and seal integrity because of the firm contact between the edge of the flange 9 and the adjoining curvature between the bead 11 and the inlet 10 of exhaust pipe 7. Repositioning of the exhaust pipe by rotation of the pipe is easily accomplished by loosening the bolts 15 and rotating the exhaust pipe to the desired orientation. The mounting of an exhaust pipe in this manner eliminates any need for welding a flange to the exhaust pipe of a steel pipe for mounting of the pipe and permits the versatility of orientation of the pipe as desired. In contrast, the conventional cast iron exhaust requires driling of holes to accommodate the bolts 15, and limits the positioning of the exhaust pipe. With the applicant's invention, the exhaust pipe is capable of infinite positioning to accommodate orientation of the pipe and the muffler on the engine.

The embodiments of the invention in which an exclusive property or privilege is claimed are defined as follows:

1. An exhaust system for an internal combustion engine comprising, a supporting conduit member including a peripheral flange defining an edge having essentially a cross-sectional configuration of 90°, an exhaust pipe received in said conduit member and including a deformable peripheral bead, an adjoining portion of said exhaust pipe joining said bead to the cylindrical portion of said exhaust pipe defining a curvature forming a radius, an aligning external peripheral surface on said exhaust pipe bearing against the inner peripheral surface of said conduit member, a clamping ring embracing said exhaust pipe engaging said peripheral bead, fastening means clamping said peripheral flange and said clamping ring against opposing sides of said peripheral bead and pressing said edge of said flange firmly against said adjoining portion to form a sealed coupling between said support member and said exhaust pipe.

2. An exhaust system for an internal combustion engine as set forth in claim 1 wherein said exhaust pipe includes a steel pipe forming a hollow bead.

3. An exhaust system for an internal combustion engine as set forth in claim 1 wherein said peripheral bead on said exhaust pipe comprises a rolled bead rolled externally from the inside of said pipe to form a peripheral bead of larger diameter on the external diameter of said exhaust pipe.

4. An exhaust system for an internal combustion engine as set forth in claim 1 wherein said supporting conduit member includes a discharge conduit on a supercharger.

5. An exhaust system for an internal combustion engine as set forth in claim 1 including a muffler mounted on said exhaust pipe.

6. An exhaust system for an internal combustion engine as set forth in claim 1 wherein said fastening means includes clamping bolts.

7. An exhaust system for an internal combustion engine as set forth in claim 1 wherein said exhaust pipe defines an elbow.

8. An exhaust system for an external combustion engine as set forth in claim 1 wherein said flange defines a radial flange, said clamping ring defines a radial facing, said fastening means thereby presses said radial flange and said radial facing of said clamping ring against the peripheral bead of said exhaust pipe to partially deform said bead and form seal integrity.

9. An exhaust system for an internal combustion engine as set forth in claim 1 wherein said conduit member includes a supercharger discharge conduit, said exhaust pipe defines a steel pipe forming a hollow peripheral raised bead on its external periphery, said clamping ring defines a radial facing for pressing against the side of said peripheral bead, fastening means defines a plurality of bolts for pressing said flange and said clamping ring firmly against said bead to slightly deform said bead and form seal integrity.

* * * * *